INVENTOR.
J. M. FOLZ

United States Patent Office 3,423,386
Patented Jan. 21, 1969

1

3,423,386
HYDROCARBON DILUENT PURIFICATION
John M. Folz, Bartlesville, Okla., assignor to Phillips Petroleum Company, a corporation of Delaware
Filed Nov. 19, 1964, Ser. No. 412,456
U.S. Cl. 260—94.3                                   3 Claims
Int. Cl. C08d 1/04, 13/38; B01d 3/00

ABSTRACT OF THE DISCLOSURE

A hydrocarbon diluent, containing impurities which are reactive with the catalyst employed in the reaction in which the diluent is used, is purified by first fractionating at least a portion of the diluent to separate impurities having lower boiling points and then fractionating a portion of the diluent fraction from the first fractionation step to separate impurities having higher boiling points.

---

Figure 1:
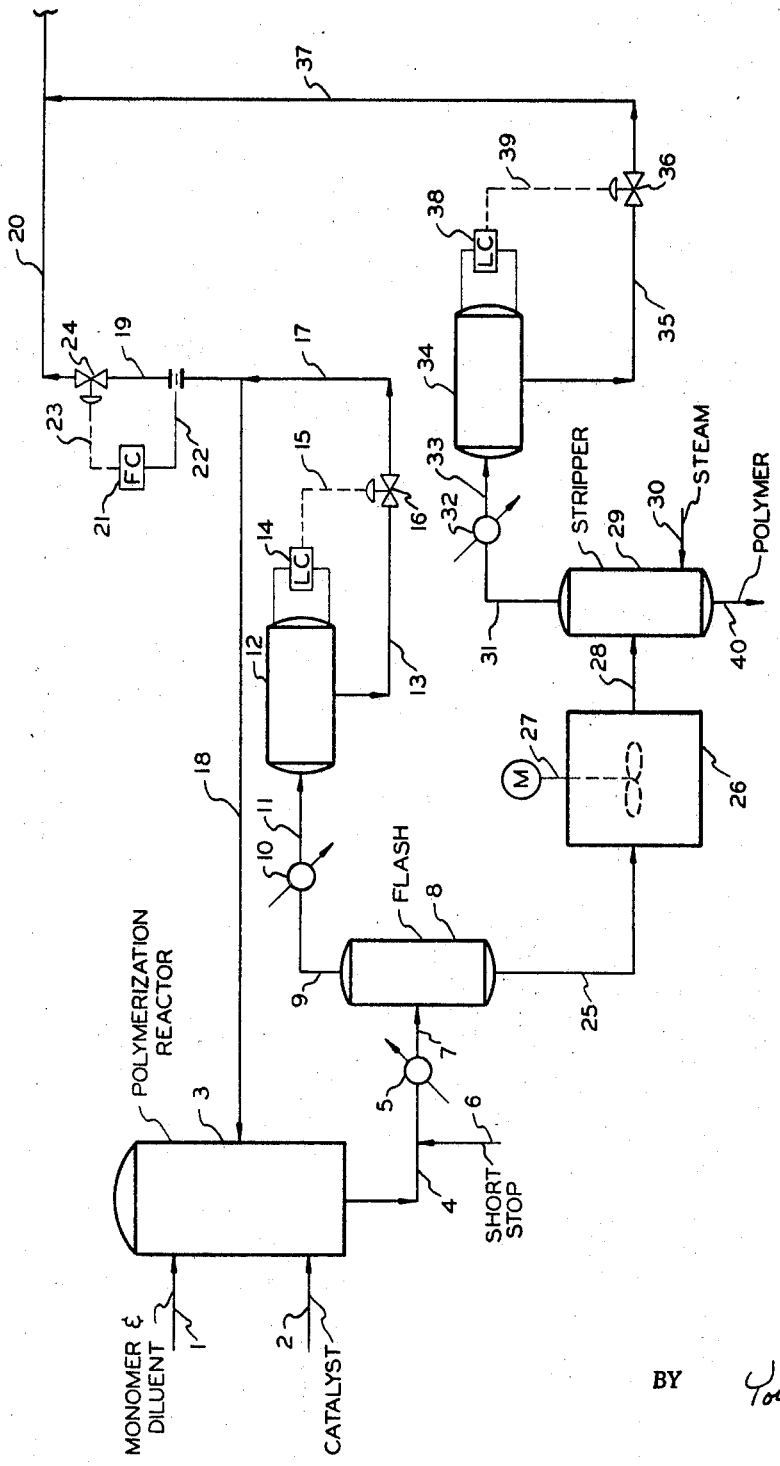
Figure 2:
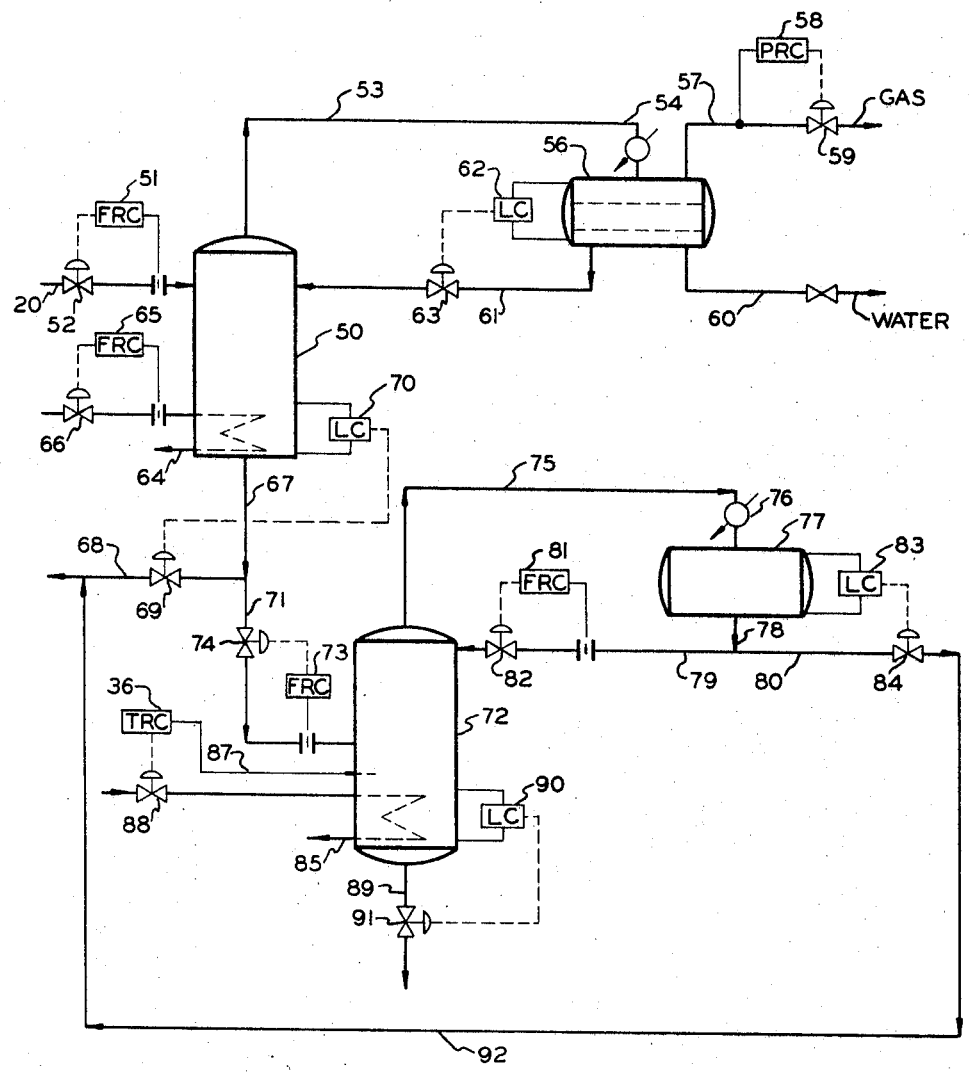

This invention relates to a method and apparatus for purification of a hydrocarbon diluent.

Although the invention is broadly applicable to the purification of hydrocarbon diluents, for the purpose of simplification the invention will be described with reference to the preparation of a rubbery product by the polymerization of a conjugated diene with an organometal and iodine and/or titanium halide catalyst system, said catalyst being introduced into a reactor in the presence of the hydrocarbon diluent.

Since large quantities of hydrocarbon diluent are employed in certain polymerization reactions, it is advantageous to separate the polymer from the hydrocarbon diluent and employ the rerun diluent in the polymerization reactor.

Heretofore the rerun diluent has been recycled to the polymerization reactor but impurities picked up by the diluent during polymerization react with and therefore consume catalyst. This causes the use of larger amounts of expensive catalyst than would be necessary if a purer hydrocarbon diluent were utilized instead.

It is also advantageous to use a portion of the hydrocarbon diluent for the preparation of the iodine solution which is one of the catalytic components. However, it has been found that this rerun diluent is unsuitable for the preparation of the iodine solution for catalyst make-up because some impurities picked up during the polymerization reaction cause a precipitation or agglomeration reaction to occur when iodine crystals are dissolved in the diluent. The precipitation or agglomeration reaction does not appear to be a solubility effect since it has been determined that when iodine crystals are dissolved in raw toluene (about 99.88 percent purity and after drying by fractionation to remove water) this reaction does not occur. The effect of the catalyst reaction and of the agglomeration or precipitation reaction is to require the polymer producer to purchase additional raw toluene or other diluent for catalyst make-up when there is already an excess of expensive diluent building up in the process which in its present state cannot be employed and therefore eventually must be discarded.

Thus it is highly desirable that the rerun diluent be purified. However, the achievement of an adequate degree of purification is quite difficult. Heretofore, purification was attempted by the use of desiccants such as alumina and silica gel but adequate purification was not achieved. Also heretofore, purification was attempted by use of a single fractionator but it was found that even the heart cuts from the fractionated diluent were not satisfactory and cause a fairly heavy precipitation or agglomeration reaction when utilized for catalyst make-up.

Quite unexpectedly, it has been found that the problem of purification of the diluent is solved by the use of a series of two fractionators which are arranged so that the second fractionator treats only a side stream of the kettle product of the first fractionator, viz. from 5 to 20 weight percent of the kettle product of the first fractionator, to remove therefrom monomer dimer and impurities such as oxygenated compounds vaporizing at a temperature higher than the diluent. The first fractionator treats from 10 to 100 weight percent of the diluent separated from the effluent of the polymerization reactor to remove therefrom water and impurities such as oxygenated compounds which vaporize at a temperature lower than the diluent.

The purified diluent from the second fractionator is returned to the polymerization reactor or used for catalyst make-up or both together with diluent which has either not been treated at all for removal of impurities or has only been treated by the first fractionator. By purifying only a side stream of the kettle product of the first fractionator and then utilizing the purified diluent along with unpurified diluent the amount of impurities in the polymerization system is reduced, compared to the total amount of diluent present, to a magnitude whereby excessive catalyst consumption and catalyst make-up precipitation or agglomeration are obviated.

It has been found that a number of impurities in the rerun diluent are at least partially responsible for the catalyst consumption and catalyst make-up precipitation or agglomeration problems. These impurities as presently understood are oxygenated compounds such as acids and alcohols. Although other impurities are known to be present which are reactive with catalysts such as iodine and titanium halides and are to some degree responsible for the agglomeration or precipitation reaction, the oxygenated compounds are prime suspects since adding these materials one at a time and in combination to dry raw toluene and preparing iodine solutions in their presence results in a precipitation or agglomeration of solids.

Accordingly, it is an object of this invention to provide a new and improved process for the treatment of hydrocarbon diluents. It is another object of this invention to provide a new and improved method and apparatus for treating rerun hydrocarbon diluent so that it will be amenable to both catalyst make-up and to reuse in polymerization operations.

Other objects, advantages and features of the invention will be readily apparent to those skilled in the art from the description, the drawings and the appended claims.

The drawing shows a diagrammatic representation of the invention.

Referring to the drawing, monomer and diluent passes by 1 and catalyst passes by 2 to polymerization reactor 3 wherein a large part of the monomer is polymerized and impurities are formed which contaminate the diluent and prevent the use thereof as diluent for the monomer or for catalyst make-up. The effluent from polymerization reactor 3 comprising polymer, monomer, diluent, catalyst and impurities such as oxygenated compounds passes by 4 to heater 5. Prior to heater 5 a shortstop material such as a rosin acid is added by 6 to react with the catalyst and thereby stop the polymerization reaction. The heated effluent passes from heater 5 through 7 to flashing tower 8 in which, due to the lower pressure and therefore flashing conditions, at least some of the monomer diluent, catalyst, shortstop material and impurities are vaporized and passed overhead by 9 to cooler 10 and then by 11 to accumulator 12. The condensed and accumulated vapors pass from 12 by 13 the flow through which is controlled by liquid level controller 14 which is operatively connected by 15 to valve 16 in line 13. After valve 16 the condensed vapors pass through 17 and either through 18 to reactor 3 or through 19 to line 20 or both. The amount of material passing through 19 to line 20 is controlled by flow controller 21 which senses by 22 the flow of material through 19 and in response thereto through 23 adjusts valve 24 to maintain a constant flow of material through 19. The remainder of material not required to maintain a constant flow through 19 is returned to reactor 3 by 18.

The kettle product of flashing unit 8 comprising primarily polymer and catalyst and having residual amounts of monomer, diluent, shortstop material and impurities passes by 25 to blender 26. In blender 26 successive portions of kettle product from 8 are accumulated and blended by mixing means 27. The blended material then passes by 28 to steam stripper 29. Steam is injected into 29 by 30 and thereby vaporizes residual monomer, diluent, shortstop, water and impurities which vapors pass overhead through 31 to cooler 32 to be condensed into a liquid. The liquid then passes by 33 to accumulator 34 and from accumulator 34 through 35, valve 36 and 37 to line 20. The amount of material flowing from accumulator 34 to line 20 is controlled by liquid level controller 38 which is operatively connected by 39 to valve 36. The kettle product of stripper 29 comprising primarily polymer and catalyst is removed for storage, further treatment and the like.

The combined streams from 19 and 37 pass by 20 into fractionator 50. The rate of flow of impure diluent through 20 is controlled by flow recorder controller 51 and valve 52. In fractionator 50 there is maintained a positive pressure the magnitude of which when coupled with the type of diluent present will determine the temperature necessary for the fractionator. In order to establish and maintain an effective separation of lower boiling impurities and diluent, fifteen trays or the equivalent thereof are utilized in the first fractionator.

Water and impurities which boil at a temperature lower than the diluent present, for example ethyl alcohol and other oxygenated compounds, pass from fractionator 50 by 53, through cooler 54 and into accumulator 56. Gas is removed from accumulator 56 by 57 and the removal is controlled by pressure recorder controller 58 and valve 59. Water is removed by valved line 60 and condensed hydrocarbons are removed by 61 and returned in toto to 50 as reflux. The rate of condensed hydrocarbon returned as reflux is controlled by liquid level controller 62 and valve 63. Heat is supplied to 50 by coil 64 and is controlled by flow recorder controller 65 and valve 66.

The diluent-containing fraction is removed from 50 by 67 and all or part can be passed by 68 through valve 69 to storage, to the polymerization reactor, and/or to the catalyst make-up operation. The operation of valve 69 is controlled by liquid level controller 70, e.g. if the liquid level in 50 increases valve 69 is opened to allow more material to pass through 68. From 5 to 20 weight percent of the diluent-containing fraction, i.e. only a sidecut of the kettle product of fractionator 50, is passed by 71 into fractionator 72 in which is maintained a positive pressure the magnitude of which will also dictate the temperature to be employed as modified by the type of diluent present. For effective separation and impurity retention at least thirty trays or the equivalent thereof are utilized in fractionator 72. The flow of material through 71 is controlled by flow recorder controller 73 and valve 74.

Due to the conditions and the number of trays present in fractionator 72 relatively pure diluent is removed from the top of said fractionator leaving behind higher boiling point impurities, for example, dimer, isobutyl alcohol and other oxygenated compounds. The number of trays or the equivalent utilized in fractionator 72 is dependent upon the reflux ratio employed in the operation thereof.

The reflux ratio as herein used is based upon the volume ratio of reflux material returned to the fractionator to overhead material removed and used for catalyst make-up and the like. Thus, for three volumes of overhead material taken from the fractionator, in order to satisfy a reflux ratio of 2/1, two volumes of said material must be returned to fractionator 72 as reflux for every one volume of said material which is removed and utilized for catalyst make-up and the like. Generally, the reflux ratio will vary over a range of from 0.5/1 to 4/1 and will preferably vary within the range of 1/1 to 3/1. In order to establish and control the reflux ratio for fractionator 72 overhead is removed therefrom by 75 and passed through a cooler 76 and then into accumulator 77. From accumulator 77 the overhead material, which is purified diluent, passes through 78 and either through 79 into fractionator 72 as reflux or through 80 and 92 to be mixed with unpurified diluent to reduce the over-all impurity content of the diluent mixture and then to be used for catalyst make-up and/or monomer diluent.

The flow of material through 79 is controlled by flow recorder 81 and valve 82. The flow of material through 80 is controlled by liquid level controller 83 and valve 84. The relative adjustments of valves 82 and 84 will be made in a manner such that the desired reflux ratio is achieved. Fractionator 72 is heated by coil 85 and the rate of heating is controlled by temperature recorder controller which is operatively attached by 87 to a thermocouple in 72 and to a valve 88. Impurities which boil at a temperature higher than the diluent are removed by 89. The flow of material through 89 is controlled by liquid level controller 90 and valve 91.

Commercially feasible diluents can contain from a trace to 15 weight percent water, iso and normal alcohols having from 1 to 4 carbon atoms per molecule (e.g. ethyl alcohol, propyl alcohol and the like), carboxylic acids having from 1 to 3 carbon atoms per molecule, and other oxygenated compounds which boil at a temperature lower than the diluent, from a trace to 10 weight percent polymer and from a trace to 10 weight percent of iso and normal alcohols having from 4 to 8 carbon atoms per molecule (e.g. butyl, isobutyl, hexyl and the like), carboxylic acids having from 4 to 10 carbon atoms per molecule (e.g. isomeric forms of the anhydride of abietic acid (rosin acid), fatty acids having from 6–22 carbon atoms per molecule such as palmitic, stearic, oleic, linoleic and the like), antioxidant additives (e.g. 2,6-di-tertiary-butyl-4-methyl thionyl), materials utilized to stop the polymerization reaction (shortstops), other oxygenated compounds which boil at temperatures higher than the diluent and monomer dimer (e.g. vinylcyclohexene, which is otherwise known as butadiene dimer).

Diluents suitable for use in this invention and the process are hydrocarbons which are substantially inert and non-detrimental to the polymerization reaction and include aromatics, such as benzene, toluene, xylene, ethylbenzene and mixtures thereof; straight and branched chain paraffins which contain up to and including 12 carbon atoms per molecule including normal pentane, isopentane, normal hexane, isohexane, 3,2,4-trimethylpentane (isooctane), normal decane, mixtures of these paraffinic hydrocarbons and the like; aromatic halides such as chloronaphthylene and the like; and cycloparaffins, such as cyclohexane and methylcyclohexane. Furthermore, mixtures of any of the before mentioned compounds can be used as diluents. Toluene is frequently used and for purposes of simplification the invention will be described with toluene as the diluent although the invention is not to be so limited. It is usually preferred to carry out the polymerization in the presence of aromatic hydrocarbons since polymers having the higher cis-contents are produced when operating in this manner.

Generally preferred for treatment is the hydrocarbon diluent which has been employed in the polymerization of a monomeric material to produce rubbery polymer, said monomeric material comprising a conjugated diene containing from 4 to 8, inclusive, carbon atoms per molecule. Examples of conjugated dienes which can be employed include 1,3-butadiene, 2-methyl-1,3-butadiene (isoprene), 2,3-dimethyl-1,3-butadiene, 2-methyl-1,3-pentadiene, chloroprene, 2,3-dimethyl-1,3-pentadiene, 2-methyl-3-ethyl-1,3-pentadiene, 2-methoxybutadiene, 2-phenylbutadiene, and the like.

Numerous methods are described in the literature for polymerizing conjugated dienes, such as 1,3-butadiene, including emulsion polymerization, alkali metal-catalyzed polymerization and alfin-catalyzed polymerization. It has recently been discovered that a synthetic elastomer containing at least 85 percent cis-1,4 addition can be produced by polymerizing 1,3-butadiene with an initiator comprising an organometal, for example a trialkylaluminum, and a titanium halide such as titanium tetraiodide, a mixture of titanium tetrachloride and titanium tetraiodide, or a mixture of titanium tetrachloride and iodine.

This invention is applicable to the polymerization operations of the above-defined conjugated dienes either alone or in admixture with each other and/or with, in minor amounts, one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, pentene-2, hexene-2, heptene-2, 2-methylbutene-1, 2-methylhexene-1, 2-ethylheptene-1 and the like. Other olefins which can be used include di- and polyolefins, such as 1,5-hexadiene, 1,4-pentadiene and 1,4,7-octatriene, and cyclic olefins, such as cyclohexane. Other examples of compounds containing an active $CH_2=C<$ group which are copolymerizable with one or more of the conjugated dienes are styrene, divinyl benzene, 3-vinyl toluene, 1-vinyl naphthalene, 3-methyl styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, and the like.

This invention is particularly applicable to a process for the polymerization of 1,3-butadiene with an initiator comprising (a) an organometal compound having the structural formula $R_nM$ wherein R is a member selected from the group consisting of alkyl, cycloalkyl, aryl, aralkyl and alkaryl radicals containing from 1 to 20 carbon atoms, M is a metal selected from the group consisting of aluminum, gallium, indium, zinc, cadmium, beryllium and mercury and $n$ is the valence of the metal M, and (b) iodine and a titanium halide having the formula $TiX_4$ where X is selected from the group consisting of chlorine and bromine.

EXAMPLE

A feedstock comprising 0.74 weight percent butadiene and impurities boiling at a lower temperature than toluene, 98.62 weight percent toluene, 0.18 weight percent water and 0.46 weight percent impurities boiling at a higher temperature than toluene was fed at the rate of 105 gallons per minute to a fractionator, drying column, which was 39 inches in diameter, 64 feet in height and had 25 trays therein with 2-foot spacings between trays. The fractionator was maintained at a top pressure of 10 p.s.i.g. and a top temperature of 235° F. The fractionator was also maintained at a bottom pressure of 15 p.s.i.g. and a bottom temperature of 273° F. The overhead vapors from the first fractionator were composed of toluene, water and butadiene and lighter impurities and, after condensing, flowed at a rate of 70.8 gallons per minute. From the 70.8 gallons per minute overhead there was removed 0.16 gallon per minute (220 gallons per day) of water and 0.64 gallon per minute (880 gallons per day) of butadiene and lighter impurities. Seventy gallons per minute of the overhead material, after removal of water, butadiene and lighter materials, was returned as reflux. The bottom flow of the first fractionator was composed primarily of toluene, isobutyl alcohol, dimer and heavier impurities. The bottom material in fractionator 1 was removed at the rate of 104.2 gallons per minute, 90 volume percent, of which 93.8 gallons per minute was directed to storage and 10.4 gallons per minute, 10 volume percent, which contained 0.4 volume percent butadiene dimer was directed to a second fractionator which was 39 inches in diameter, 56 feet in height and had therein 50 trays of 10-inch spacings. The top of the second fractionator was maintained at a pressure of 10 p.s.i.g. and a temperature of 235° F. and the bottom thereof was maintained at a pressure of 15 p.s.i.g. and a temperature of 273° F. The overhead material from the second fractionator was removed at the rate of 30.9 gallons per minute and in order to maintain a reflux ratio of 2:1, 20.6 gallons per minute was returned to the second fractionator as reflux while 10.3 gallons per minute of substantially pure toluene was removed for use as catalyst make-up and the like. The bottom material in the second fractionator was removed at the rate of 0.1 gallon per minute and comprised essentially isobutyl alcohol, butadiene dimer and heavier impurities in the presence of some small amount of toluene.

Thus, it can be seen that according to this invention from 105 gallons per minute of impure diluent there is recovered 30.9 gallons per minute, of which 10.3 gallons per minute is immediately available for reuse as diluent and for use as catalyst make-up.

Reasonable variations and modifications of this invention can be made, or followed in view of the foregoing, without departing from the spirit or scope thereof.

I claim:

1. A method comprising polymerizing butadiene with an alkylaluminum catalyst containing an iodine compound in the presence of a hydrocarbon diluent which picks up impurities during the polymerization reaction which will react with the catalyst upon reuse of the diluent, said impurities including from a trace to 15 weight percent water based on the total amount of diluent present, iso and normal alcohols having from 1 to 4 carbon atoms per molecule, carboxylic acids having from 1 to 3 carbon atoms per molecule, and from a trace to 10 weight percent based on the amount of diluent present of iso and normal alcohols having from 4 to 8 carbon atoms per molecule, carboxylic acids having from 4 to 10 carbon atoms per molecule and butadiene dimer; separating diluent containing said impurities having boiling temperatures both higher and lower than the boiling temperature of the diluent from the polymerization effluent; passing 10 to 100 weight percent of said diluent and impurities to a first fractionator wherein water, iso and normal alcohols having from 1 to 4 carbon atoms per molecule and carboxylic acids having from 1 to 3 carbon atoms per molecule which are the impurities having boiling temperatures lower than the boiling temperature of said diluent are separated therefrom; recovering a first stream containing said diluent and remaining impurities from said first fractionator; passing from 5 to 20 weight percent of said first stream to a second fractionator wherein iso and normal alcohols having from 4 to 8 carbon atoms per molecule, carboxylic acids having 4 to 10 carbon atoms per molecule and butadiene dimer which are impurities having boiling temperatures higher than the boiling point of said diluent are separated therefrom; recovering a second stream containing purified diluent as overhead from said second fractionator; and passing said first and second streams to said polymerizing step.

2. A method according to claim 1 wherein said hydrocarbon diluent is toluene.

3. The method of claim 1 wherein said first fractionator has the equivalent of at least fifteen trays, said second fractionator has the equivalent of at least thirty trays and has a ratio of reflux returned to said second fractionator to overhead material removed from said second fractionator for use as diluent in the range of from 0.5/1 to 4/1.

References Cited
UNITED STATES PATENTS

| | | | |
|---|---|---|---|
| 3,250,757 | 5/1966 | Smith et al. | 260—94.3 |
| 2,996,492 | 8/1961 | Tegge et al. | 260—93.7 |
| 3,014,849 | 12/1961 | Cottle | 202—46 |
| 2,591,712 | 4/1952 | Morrell et al. | 202—39.5 |

JOSEPH L. SCHOFER, *Primary Examiner.*

R. A. GAITHER, *Assistant Examiner.*

U.S. Cl. X.R.

260—680; 203—71, 84, 88; 260—82.3, 85.3, 85.5, 87.7